Figure 1:
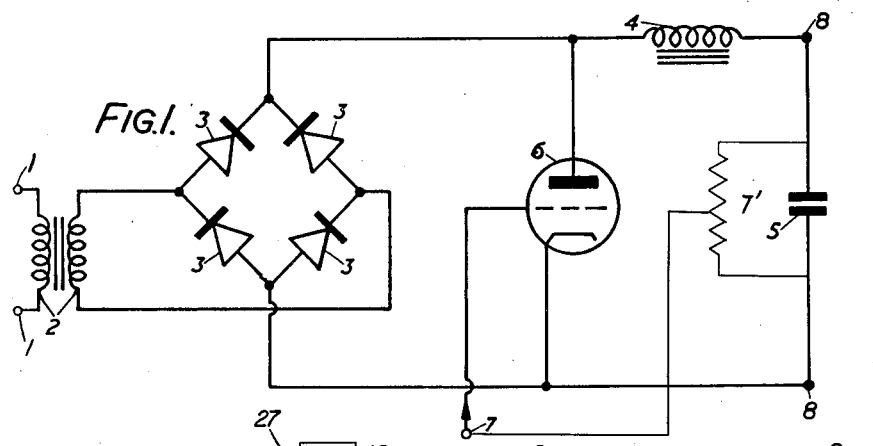

May 8, 1962     A. N. HEIGHTMAN ET AL     3,034,037

VOLTAGE REGULATING CIRCUIT ARRANGEMENTS

Filed Dec. 30, 1957     3 Sheets-Sheet 1

INVENTORS:
Anthony Norman Heightman
and
Walter Thomas Underhill
By: Baldwin & Wight, ATTORNEYS

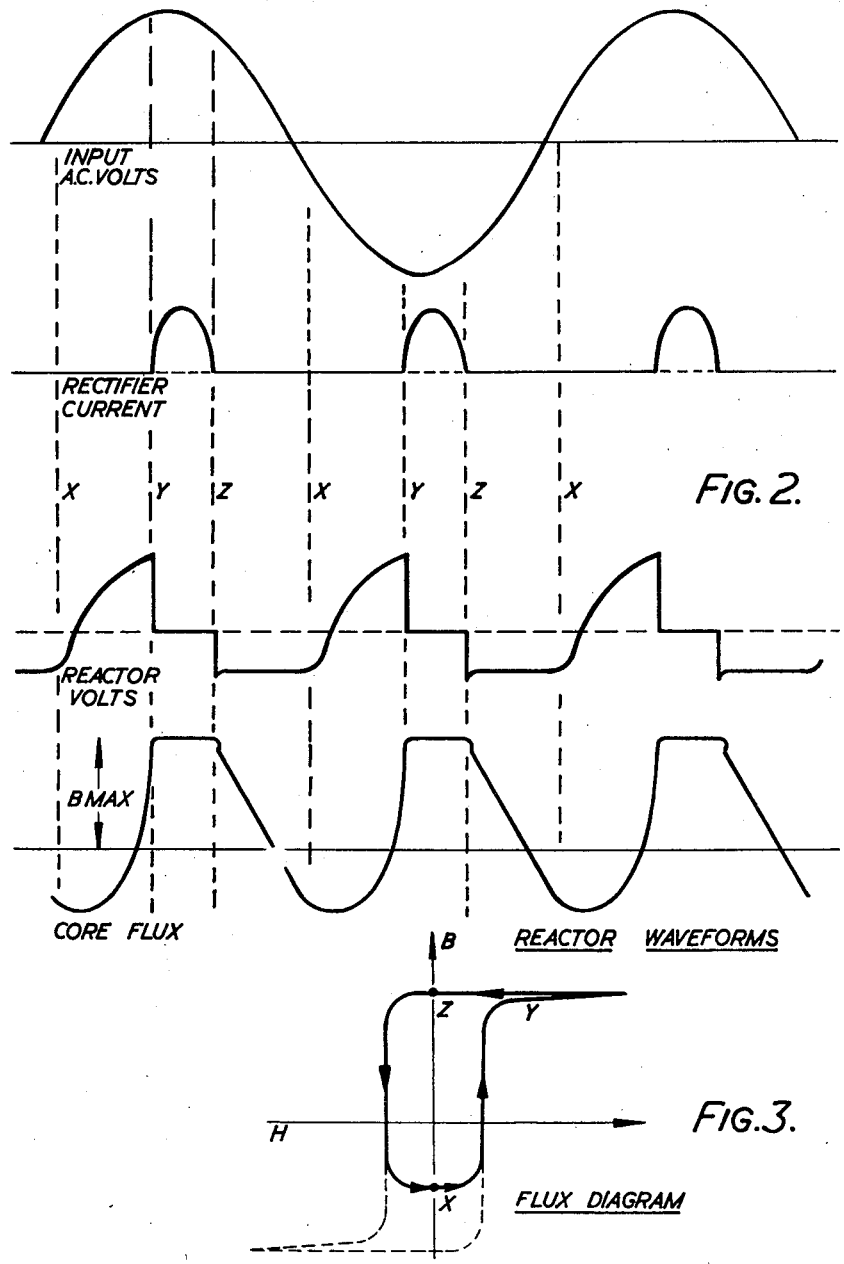

United States Patent Office 3,034,037
Patented May 8, 1962

3,034,037
VOLTAGE REGULATING CIRCUIT
ARRANGEMENTS
Anthony Norman Heightman and Walter Thomas Underhill, Essex, England, assignors to Marconi's Wireless Telegraph Company Limited, London, England, a British company
Filed Dec. 30, 1957, Ser. No. 706,122
Claims priority, application Great Britain Feb. 22, 1957
6 Claims. (Cl. 323—66)

This invention relates to voltage regulating circuit arrangements and has for its object to provide improved and simple voltage regulating circuit arrangements whereby an output direct current voltage of desired stabilized value may be derived from an available alternating current voltage source.

As will be seen later the invention makes use of a known type of device, hereinafter as termed a saturable transductor reactor, which is in the form of a winding on a core having a hysteresis loop (D-H magnetization curve) of approximately rectangular shape. As is well known the impedance presented by the winding of such a device is very low when the core is saturated and very high when it is not. To quote a typical practial case, the current passed by the winding of such a device under given conditions of applied voltage and frequency may fall from a figure of the order of 8 amperes when the core is saturated to a figure of the order of 10 ma. when the core is not. Such a device therefore approximates to a switch which can be controlled by changing the condition of the core from the saturated to the non-saturated condition or vice versa, although, of course, the "switch" has no true open circuit position.

According to the main feature of this invention a voltage regulating circuit arrangement comprises means for rectifying voltage from a source of applied alternating current voltage, a reservoir condenser, a changing circuit for charging said condenser from the rectified voltage, said circuit including the winding of a saturable transductor reactor having a core with a near-rectangular hysteresis loop, and a discharging circuit for said condenser said discharging circuit including said winding and the anode-cathode space of a valve controlled in accordance with the voltage across said condenser.

Regulated output voltage may be taken from across the reservoir condenser through an output circuit which may, with advantage, include a few turns of winding on the reactor core.

The invention, as so far described, is capable of substantially preventing variations of D.C. output voltage occurring as a result of relatively slow variations of input A.C. voltage or load current, but it is obviously incapable of stabilizing against the effects of supply voltage disturbances or load current occurring too rapidly for the reactor. In cases where such fast variations are likely to occur it may be necessary to supplement the relatively slow acting stabilizer hereinbefore described by an auxiliary quick acting regulator circuit arrangement.

According to one subordinate feature of this invention a pair of valves with their anode-cathode spaces in series are included in a circuit extending across the reservoir condenser with the anode of one of said valves towards the positive side of said condenser; a coupling choke in series with a second condenser is connected in a path in parallel with the anode-cathode space of said one valve; stabilized output voltage is taken from the positive side of said second condenser; and opposite voltages of magnitudes dependent on the stabilized output voltage are derived and applied to the control electrodes of said valves, one to one and the other to the other. Preferably the derived voltages are obtained by means of a D.C. amplifier having its input terminal connected to a tap on a potentiometer connected across the stabilized voltage output terminals of the whole arrangement and two output terminals of opposite polarities connected one to the control electrode of one valve and the other to the control electrode of the other.

According to a second subordinate feature of the invention, voltage from the positive terminal of the reservoir condenser is applied to the center point of a coupling choke the ends of which are connected to the anodes of a pair of A.C. amplifier valves which, in conjunction with the two halves of said choke provide two parallel paths in a circuit included in parallel with said reservoir condenser; stabilized output voltage is taken from one end of said choke; and opposite voltages of magnitudes dependent on the stabilized output voltage are derived and applied to the control electrodes of said valves, one to one and the other to the other. Preferably the derived voltages are obtained by means of a D.C. amplifier having its input terminal connected to a tap on a potentiometer connected across the stabilized voltage output terminals of the whole arrangement and two output terminals of opposite polarities connected one to the control electrode of one valve and the other to the control electrode of the other.

Figure 4:
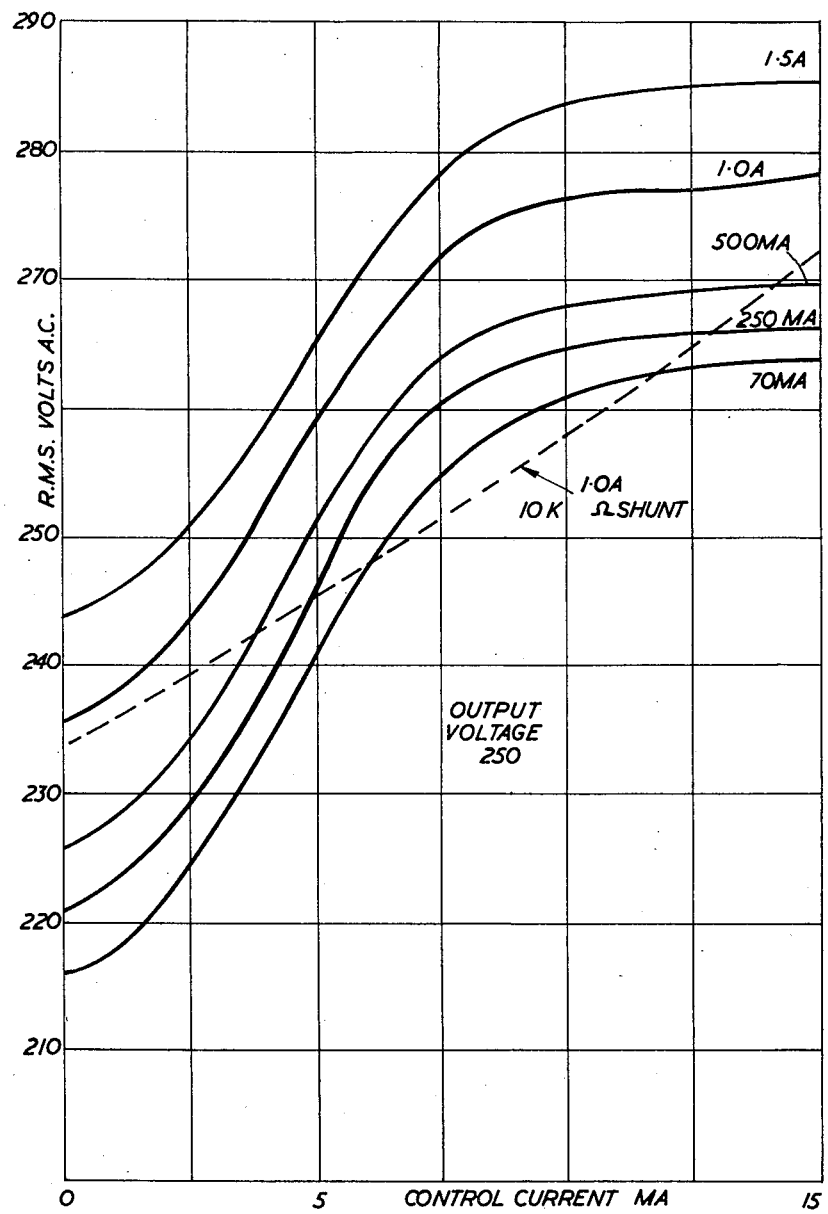

The invention is illustrated in the accompanying drawings in which:

FIG. 1 is a simplified diagram showing the essential parts of one embodiment of the main feature of this invention;

FIGS. 2, 3, and 4 are explanatory graphical figures related to FIG. 1; and

Figure 5:
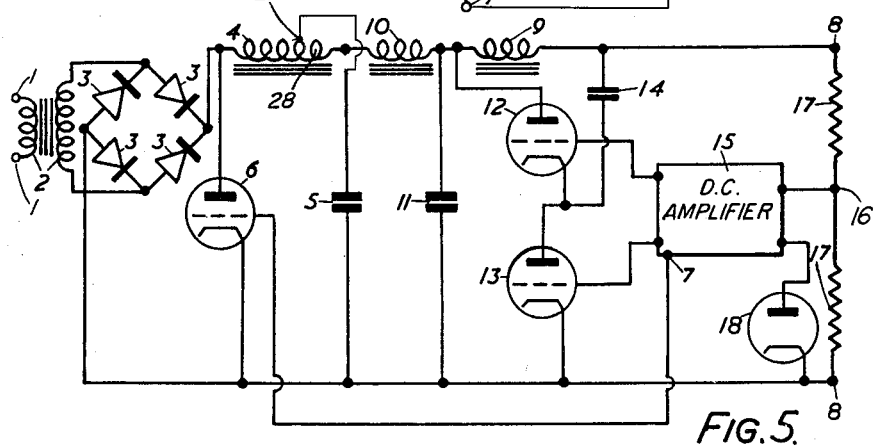
Figure 6:
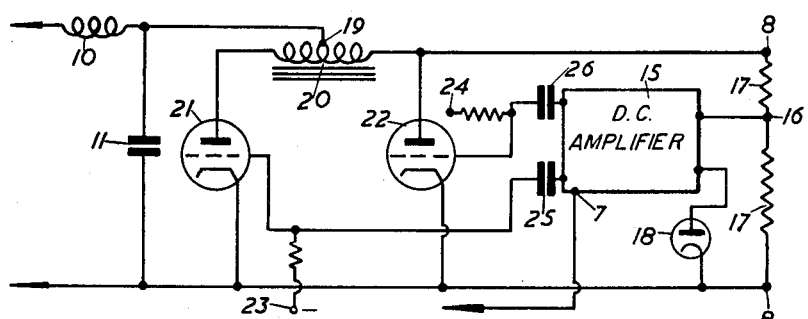

FIGS. 5 and 6 are diagrams of embodiments utilizing the first and second subordinate features of this invention, respectively.

Referring to FIG. 1 which shows one form of regulating circuit arrangement in accordance with this invention, an original source (not shown) of applied alternating current voltage, e.g. a mains source, is connected at the input terminals 1 and the applied voltage is fed through a transformer 2 to the opposite ends of one diagonal of a rectifier bridge shown as consisting of four rectifiers 3 in well known bridge connection. A smoothing filter (not shown) may follow the reactor 4 and condenser 5 if required. Rectified voltage appears at the ends of the other diagonal of the bridge and is applied through the winding 4 of a saturable transductor reactor to a reservoir condenser 5. The saturable transductor reactor has, as already stated, a near-rectangular hysteresis loop so that its impedance is very low when the core is saturated, but very high when it is not. Across the output diagonal of the bridge is connected the anode-cathode space of a control valve 6, exemplified as a triode, to the control grid of which is applied a control voltage which appears at a terminal 7 and may, for example be voltage obtained from a tap on a potentiometer 7' across the condenser 5 with suitable negative bias voltage superimposed. This tap may be adjustable. Stabilized direct current voltage is taken off to a load (not shown) from output terminals 8.

With this arrangement the current flow via the rectifiers is, of course, uni-directional and the design is such that at some time in each half cycle of the applied alternating current voltage, the reactor core reaches saturation. When it does so, the impedance of the winding falls to a very low value and a substantial charging current flows into the condenser 5. By varying the instant at which the core saturation occurs, the charge acquired by the condenser and hence the main output voltage at the terminals 8 may be varied, the output voltage being high if saturation occurs early in the half cycle and low if it occurs late.

The flux in the core must change if rectifier current is not to flow, because it is the back E.M.F. due to changing flux in the core which inhibits the current flow. Therefore, in order to obtain lowest output voltage the core must be set to its greatest flux in the sense opposite to that in which saturation will ultimately occur prior to a given half cycle of input alternating current so that the greatest flux change may be obtained. The control valve 6 sets the core to the required flux condition by passing the correct amount of current (for that condition) from the condenser through the winding 4 and the valve, the direction of current being such as to carry the core away from the saturation condition in which it has been left after the flow of current from the rectifier bridge.

FIGS. 2 and 3 illustrate the cycle of operations, the latter showing the hysteresis loop of the core. In these figures letter references X, Y and Z are applied to indicate particular times, the same letters indicating the same times throughout these figures. In FIG. 3 the axes letters B and H have their usual significance.

Referring to FIGS. 2 and 3, at a given instant X after the start of a half cycle of A.C. input voltage, the said input voltage passes the value of that across the condenser 5 and the rectifier bridge conducts. As the reactor core is not yet saturated, the charging current into the condenser 5 is negligibly small. At some time Y, however, saturation of the core occurs and a substantial pulse of charging current commences to flow into the condenser 5. This pulse continues until the time Z when the input voltage has fallen just below that across the condenser, when the rectifiers can no longer conduct.

When this point is reached, the control valve current (which was previously of negligible effect compared to the very much greater condenser charging current) becomes effective and flows from the condenser 5 through the winding on reactor 4 and the valve 6, driving the core towards its initially non-saturated condition—in other words re-setting the core flux at a value dependent upon the current passed by the valve 6. This "re-setting" period ends when the time X in the cycle is again reached, the rectifiers again conduct and the valve current is once more drawn principally from the output terminals of the bridge.

FIG. 4 is a set of curves taken experimentally and shows control valve current required to maintain a constant 250 volt output plotted against input voltage with load current as a parameter. The curve shown in broken lines was obtained by shunting the reactor with a 10,000 ohm resistor in order to simulate a constant voltage rather than a constant current control source. It may be shown that a reactor operated under the described conditions is a voltage rather than a current control device, a view which is confirmed by the greater linearily of the broken line curve as compared to the other curves in FIG. 4.

In practice the rectifiers will tend to pass a certain amount of current in the reverse direction and this of course tends to limit the range of control by the valve 6. This defect may be reduced or eliminated by passing the load current through a few turns wound on the reactor in such sense as to oppose the magnetization due to the rectifier reverse current if an extra winding constituted by these few turns is provided, it will, of course, introduce positive feedback and accordingly, if such an extra winding is provided, care must be taken that it is not such as to cause instability.

FIG. 5 shows a modification containing, in addition to the slow acting reactor regulator shown in FIG. 1, a quick acting valve regulator for taking care of rapid variations of supply voltage and/or load current. Throughout the figures like references denote like parts. It will be seen that much of FIG. 5 is a mere repetition of FIG. 1 requiring no further description. The reactor 4 is provided with a tap 27 that connects directly with condenser 5, thus including a few turns 28 of the winding of saturable reactor 4 in the output circuit as shown. The reactor 4 is connected to the output terminal 8 through a circuit including a coupling choke 9. FIG. 5 also shows a filter consisting of a series filter choke 10 and shunt filter capacity 11 as well known per se. This filter is, of course, not necessary and in many cases may be omitted and the choke 9 directly connected to the reactor 4. A path which is effectively in parallel with the reservoir condenser 5 and is actually connected to the junction point of the choke 9 and 10 is provided as shown, this path consisting of the series connected anode-cathode spaces of two A.C., class A.B. operated amplifier valves 12 and 13. The coupling choke 9 is also in series with a coupling condenser 14 across the anode-cathode space of the more positive valve 12 and the control grids of these valves are connected to opposite polarity output terminals of a D.C. amplifier 15 whose input terminal is connected to a tap 16 on a potentiometer consisting of resistances 17 and connected between the output terminals 8. The input circuit of the D.C. amplifier is returned to earth or its equivalent through a reference neon diode or similar discharge tube 18. The control voltage for the control valve 6 is taken from an output terminal of the D.C. amplifier 15, this terminal being marked 7 to correspond with the similarly marked terminal of FIG. 1. The senses of the voltages applied to the grids of the two valves 12 and 13 from the amplifier 15 are, as stated, opposite.

Under quiescent conditions a small current flows in each valve 12 and 13, and the anode voltage of each is substantially one half that at the junction point of the chokes 9 and 10, the steady voltage on the coupling condenser 14 being a little less than half this voltage. If the output voltage at the positive output terminal 8 tends to rise, the drive to the grid of valve 13 increases in the positive direction and this valve draws more current via the condenser 14, thus tending to reduce output voltage. The opposite happens if the output voltage tends to fall, the current passed by the valve 12 being then increased so as to tend to discharge the condenser 14 through the output load. The choke 9 ensures that the valve current is drawn from or added to the load current instead of being taken from the condenser 5 (or condenser 11 if the filter 10—11 is provided) so that in effect the choke increases the effective source impedance of the supply causing the effect of changes in valve impedances to be more pronounced. The arrangement of FIG. 5 does not merely suppress rapid acting supply voltage and load disturbances as such, but also reduces ripple voltages from the supply and adsorbs modulation of load current caused by the operation of valves (not shown) which may be comprised in the load.

FIG. 6 is a part diagram showing so far as is necessary to an understanding thereof, another form of quick acting regulator which may be used in substitution for that shown in FIG. 5. In FIG. 6 the parts not shown are as in FIG. 5, the filter choke 10 and filter condenser 11 corresponding to the similarly referenced elements in FIG. 5. As will be seen, the end of the choke 10 is taken to the center-tap 19 of a center-tapped coupling choke 20 whose ends are connected to the anodes of A.C. amplifier valves 21 and 22, the cathodes of which are returned to the earth line. Suitable D.C. bias is applied to the control grids of the two valves from points 23 and 24 and the said control grids are connected to receive opposite control voltages through condensers 25, 26 from the output terminals of a D.C. amplifier 15 fed from a tap 16 on a potentiometer 17 as in FIG. 5. As will at once be apparent, the main difference between the high speed regulators of FIGS. 5 and 6 is that the circuit of FIG. 5 uses series valves with choke-capacity coupling and the circuit of FIG. 6 uses shunt valves with choke coupling.

If, with the arrangement of FIGURE 6, the output voltage at the positive terminal 8 tends to rise, the drive to the grid of valve 22 increases in the positive direction and valve 22 draws more current thus tending to reduce the output voltage. If the output voltage tends to decrease, valve 21 draws more current from condenser 11 through one half of the choke 20, and due to transformer action between the two halves of choke 20 the output voltage is increased.

We claim:

1. A voltage regulating circuit arrangement comprising a pair of input terminals, a reservoir condenser, a charging circuit for said condenser comprising a saturable reactor having a winding and a core with a near-rectangular hysteresis loop, said winding being connected between said condenser and one of said input terminals, a discharge tube having a cathode, a control electrode and an anode, a discharging circuit for said condenser including said winding and said discharge tube, means for deriving a control voltage from said condenser and applying said control voltage to said control electrode and means for deriving a stabilized direct current output voltage from said circuit.

2. A voltage regulating circuit arrangement as set forth in claim 1 wherein said regulated output voltage is taken from across the reservoir condenser through an output circuit which includes a plurality of turns of winding on the reactor core.

3. A voltage regulating circuit arrangement as set forth in claim 1 wherein a pair of valves, having cathodes, control electrodes and anodes with their anode-cathode spaces in series are included in a circuit extending across the reservoir condenser with the anode of one of said valves towards the positive side of said condenser; and wherein a coupling choke is connected in series with a second condenser in a path in parallel with the anode-cathode space of said one valve; and wherein said regulated output voltage is taken from the positive side of said second condenser; and wherein opposite voltages of magnitudes dependent on said regulated output voltage are derived and applied to the control electrodes of said valves, one to one and the other to the other.

4. A voltage regulating circuit arrangement as set forth in claim 1 wherein voltage from the positive terminal of the reservoir condenser is applied to the center point of a coupling choke divided into two halves, the ends of which are connected to the anodes of a pair of A.C. amplifier valves which, in conjunction with the two halves of said choke provide two parallel paths in a circuit included in parallel with said reservoir condenser wherein said means for deriving a regulated output voltage includes a conductor connected to one end of said choke; and means for deriving opposite voltages of magnitudes dependent on the regulated output voltage and applying said last mentioned voltages to the control electrodes of said valves one to one and the other to the other.

5. A voltage regulating circuit arrangement as set forth in claim 1 wherein voltage from the positive terminal of the reservoir condenser is applied to the center point of a coupling choke divided into two halves the ends of which are connected to the anodes of a pair of A.C. amplifier valves which, in conjunction with the two halves of said choke provide two parallel paths in a circuit included in parallel with said reservoir condenser; means for taking off stabilized output voltage from one end of said choke; and means for deriving opposite voltages of magnitudes dependent on the stabilized output voltage and applying said last mentioned voltages to the control electrodes of said valves one to one and the other to the other, and wherein the derived voltages are obtained by means of a D.C. amplifier having its input connected to a tap on a potentiometer connected across the regulated voltage output terminals of the circuit arrangement and two output terminals of opposite polarities connected one to the control electrode of one valve and the other to the control electrode of the other valve.

6. A voltage regulating circuit arrangement as set forth in claim 1 wherein a pair of valves having cathodes, control electrodes and anodes with their anode-cathode spaces in series are included in a circuit extending across the reservoir condenser with the anode of one of said valves connected with the positive side of said condenser; a coupling choke connected in series with a second condenser in a path in parallel with the anode-cathode space of said one valve; and wherein said regulated output voltage is taken from the positive side of said second condenser; opposite voltages of magnitudes dependent on the regulated output voltage being derived and applied to the control electrodes of said valves, one to one and the other to the other, and wherein the derived voltages are obtained by means of a D.C. amplifier having its input terminal connected to a tap on a potentiometer connected across said output terminals of the circuit arrangement and two output terminals of opposite polarities connected one to the control electrode of one valve and the other to the control electrode of the other.

References Cited in the file of this patent

UNITED STATES PATENTS

| | | |
|---|---|---|
| 2,638,571 | Schultz | May 12, 1953 |
| 2,807,774 | Dudziak | Sept. 24, 1957 |
| 2,808,511 | Thulin | Oct. 1, 1957 |
| 2,839,717 | Mandelkehr et al. | June 17, 1958 |
| 2,919,414 | Neitzert | Dec. 29, 1959 |